(12) United States Patent
Fichtel et al.

(10) Patent No.: US 10,058,814 B2
(45) Date of Patent: Aug. 28, 2018

(54) PROCESS FOR PURIFYING FLUIDS

(71) Applicant: FTU GmbH, Starnberg (DE)

(72) Inventors: Michael Fichtel, Starnberg (DE); Roland Fichtel, Unterbrunn (DE)

( * ) Notice: Subject to any disclaimer, the term of this patent is extended or adjusted under 35 U.S.C. 154(b) by 0 days.

(21) Appl. No.: 15/505,555

(22) PCT Filed: Sep. 22, 2015

(86) PCT No.: PCT/EP2015/071735
§ 371 (c)(1),
(2) Date: Feb. 21, 2017

(87) PCT Pub. No.: WO2016/046203
PCT Pub. Date: Mar. 31, 2016

(65) Prior Publication Data
US 2017/0182451 A1    Jun. 29, 2017

(30) Foreign Application Priority Data
Sep. 22, 2014   (DE) .................. 10 2014 113 620

(51) Int. Cl.
*B01D 53/02* (2006.01)
*B01D 53/04* (2006.01)
*B01J 20/08* (2006.01)
*C02F 1/28* (2006.01)
*B01J 20/10* (2006.01)
*B01J 20/16* (2006.01)
*B01D 53/12* (2006.01)
*B01D 53/86* (2006.01)
*B01D 53/64* (2006.01)
*B01J 20/30* (2006.01)
*B01J 20/18* (2006.01)
*C02F 101/20* (2006.01)

(52) U.S. Cl.
CPC ............ *B01D 53/02* (2013.01); *B01D 53/04* (2013.01); *B01D 53/12* (2013.01); *B01D 53/64* (2013.01); *B01D 53/864* (2013.01); *B01D 53/8631* (2013.01); *B01D 53/8662* (2013.01); *B01D 53/8668* (2013.01); *B01J 20/08* (2013.01); *B01J 20/103* (2013.01); *B01J 20/16* (2013.01); *B01J 20/18* (2013.01); *B01J 20/3071* (2013.01); *C02F 1/281* (2013.01); *B01D 2253/104* (2013.01); *B01D 2253/106* (2013.01); *B01D 2253/108* (2013.01); *B01D 2253/1124* (2013.01); *B01D 2253/25* (2013.01); *B01D 2253/306* (2013.01); *B01D 2257/2045* (2013.01); *B01D 2257/2064* (2013.01); *B01D 2257/302* (2013.01); *B01D 2257/304* (2013.01); *B01D 2257/404* (2013.01); *B01D 2257/502* (2013.01); *B01D 2257/60* (2013.01); *B01D 2257/602* (2013.01); *B01D 2257/7027* (2013.01); *B01D 2257/91* (2013.01); *B01D 2258/0283* (2013.01); *B01D 2258/0291* (2013.01); *C02F 2101/20* (2013.01)

(58) Field of Classification Search
CPC .. C02F 2101/20; C02F 1/281; C02F 2101/10; B01J 20/06; B01J 20/08; B01J 20/14; B01D 53/38; B01D 53/46; B01D 53/40
See application file for complete search history.

(56) References Cited

U.S. PATENT DOCUMENTS

| | | | | |
|---|---|---|---|---|
| 4,249,954 A * | 2/1981 | Keogh | ...................... | C04B 7/28 106/407 |
| 4,440,867 A * | 4/1984 | Sabherwal | ............... | B01J 20/10 210/660 |
| 4,948,516 A * | 8/1990 | Fisher | ...................... | C02F 1/722 106/716 |
| 5,047,221 A * | 9/1991 | Jozewicz | ............. | B01D 53/501 423/243.1 |
| 7,981,375 B2 | 7/2011 | Ramberg | | |
| 9,597,654 B2 * | 3/2017 | Fichtel | ............... | B01J 20/28059 |
| 2003/0064889 A1 | 4/2003 | Sughrue et al. | | |
| 2007/0272616 A1 * | 11/2007 | Young | .................. | B01D 21/003 210/716 |

FOREIGN PATENT DOCUMENTS

| | | | | | |
|---|---|---|---|---|---|
| BE | | 784474 A7 | 10/1972 | | |
| BR | | PI0817602 A2 * | 10/2014 | ............. | B01J 20/02 |
| CN | | 102976434 A | 3/2013 | | |
| DE | | 33 24 091 A1 | 1/1984 | | |
| DE | | 19745191 A1 * | 4/1999 | ............. | B01D 53/64 |
| DE | | 19936930 A1 | 2/2001 | | |
| DE | 10 2012 000699 A1 | | 7/2013 | | |
| DE | 10 2012 012367 A1 | | 12/2013 | | |

(Continued)

OTHER PUBLICATIONS

Di Natale, F. 2006 "Capture of mercury ions by natural and industrial materials" *Journal of Hazardous Materials* B132: 220-225.

(Continued)

*Primary Examiner* — Timothy C Vanoy

(74) *Attorney, Agent, or Firm* — Knobbe, Martens, Olson & Bear, LLP

(57) ABSTRACT

A process removes substances from fluids, especially from exhaust gases of combustion plants, by contacting the fluid to be purified with Puzzolanes that contain at least 5% by weight of silicon and/or aluminum-compounds. These compounds can be dissolved away under the conditions prevailing during purification, such that they are excavated from the Puzzolanes.

11 Claims, No Drawings

(56) References Cited

FOREIGN PATENT DOCUMENTS

| FR | 2994859 A1 | * | 3/2014 | ............ B01J 20/06 |
| FR | 2994859 B1 | * | 5/2016 | ............ B01J 20/06 |
| JP | H08 89757 A | | 4/1996 | |
| JP | 2006/282410 A | | 10/2006 | |
| WO | WO 2010128534 A1 | * | 11/2010 | ............ A62B 29/00 |
| WO | WO 2012/071206 A1 | | 5/2012 | |

OTHER PUBLICATIONS

Maina, et al. 2011 "Enhancement of lime reactivity by addition of diatomite" *Fuel Processing Technology* 92: 1910-1919.

\* cited by examiner

PROCESS FOR PURIFYING FLUIDS

FIELD OF THE INVENTION

The present invention relates to a process for removing substances from fluids, especially from exhaust gases of combustion plants.

BACKGROUND OF THE INVENTION

Nowadays fossil fuels, such as gas, oil and coal are largely used for producing electrical or heat energy, for burning away waste or for converting or purifying substances, in particular ore. Due to an increasing demand of electrical energy and the concurrent pullout from running nuclear power plants in countries such as Germany and Japan, coal has gained an increased attraction, since it is also present in industrial countries themselves.

Upon burning fossil fuels, in particular coal, carbon dioxide is released, but also other noxious substances, such as e.g. sulphur dioxide, nitrogen dioxide, carbohydrates, hydrochloric acid, dioxins, furans, fly-ash, carbon black, but also highly toxic heavy metals, such as e.g. mercury. Such problems especially arise in waste incinerating plants, wherein an inhomogeneous mixture of different disposed articles are burnt in conjunction with the fossil fuels, so that the toxins contained in the materials or produced during combustion thereof are emitted into the environment.

Among others for these reasons combustion plants are not allowed to be run without a complex purification system, which enables an essentially complete removal of toxic substances from the combustion gases. However, in spite of all of the measures taken, the amount of mercury in the environment increases, which increase is mainly due to an increasing use of coal in combustion plants.

According to information provided by the environmental program of the United Nations (UNEP) the amount or mercury (Hg) emitted into the environment in 2005 sums up to about 498 tons, of which about 6 tons emerge from German power plants, about 50 tons from US generating plants and more than 100 tons from Chinese power generating plants.

For purifying combustions gases dust removal processes are conventionally put to use, such as using surface filters, electric filters, gas cleaners, and centrifugal force separators. For removal of gaseous and fluid matter methods of thermic post combustion, of catalytic transformation or methods of adsorption and absorption are used. Due to economic aspects the purification of combustion gases focuses on the methods of adsorption and absorption, by means of which an effective reduction of toxins in said combustion gases may be achieved.

Absorption may be achieved simply my guiding the combustion gases through water, which contains chemical additives or absorbents During absorption gases or liquids are channelled over or through, respectively, a particular material, which material may hold the substances contained therein on its surface. The absorbent may be subjected to a thermal regeneration, by means of which the absorbed substances are disengaged from the absorbent, which may again be put to use.

A major criterion for selecting a material suitable as an adsorbent is its active surface area, which makes activated carbon (active surface area of about 300-1000 $m^2/g$) an appropriate material for a number of applications.

However, the use of activated carbon is associated with a number of shortcomings. For instance, due to its inherent flammable nature activated carbon may not be used in combustion gases exhibiting higher temperature simply for safety reasons. Furthermore, thermal desorption is associated with problems, since the temperatures used for this may not be chosen too high, which on the other hand essentially prevents full desorption.

Furthermore, the use of activated carbon may impair the industrial application of fly-ashes accumulating during combustion. These fly-ashes, collected from filters of power plants are generally considered as assets and are employed among others as substitute for cement in the production of concrete. Thus, injecting activated carbon into a stream of combustion gases may worsen the quality of fly-ashes and may compromise their use in the production of concrete, since due to their high specific surface area they tend to absorb concrete aggregates, such as air void formers, which are essential for conveying frost-tau-properties to concrete. For this reason a number of expensive additional measures need to be taken for removing activated carbon from fly ashes.

For solving this problem DE-P 10 2012 012 367 proposes the use of modified Trass, which active surface has been increased to a value according to BET of 40 $m^2$ and above by means of treatment with acids and/or with mixtures of water and tensides. However, a disadvantage resides in that the Trass must be subjected to a pre-treatment prior to its use in power plants or combustion plants, respectively.

SUMMARY OF THE INVENTION

In view of that a problem of the present invention resides in providing a simple and cost-effective process for purifying fluids, especially combustion gases of power plants, which is multifunctional and which does not exhibit the shortcomings of the prior art processes.

This problem has been solved by providing a process for purifying fluids, wherein Puzzolanes are put to use, which exhibit a portion of matter of at least about 5% by weight, releasable under the prevailing process conditions.

Puzzolanes are stone materials commonly produced under heat, e.g. during volcano activity, which essentially consist of alumina ($Al_2O_3$), limestone, iron oxide, alkaline compounds and also silicon compounds, i.e. silicon dioxide, for example silica gel, silicates, and/or zeolites. In principle a distinction is made between natural Puzzolanes (pozzolana) and synthetic Puzzolanes, e.g. ground brick.

During the experiments, leading to the present invention, the named inventors found that particular Puzzolanes, even though not exhibiting a large surface area as such, do show a surprisingly high effectivity in removing toxic substances from gases and fluids in situ without any pre-treatment.

These Puzzolanes proposed in the present invention show a portion of matter, i.e. silicon-/aluminium-compounds, for example silicon dioxide, silica gel, silicates and/or zeolites and/or further components, such as aluminium compounds, e.g. $Al_2O_3$, of at least about 5% by weight, that are dissolved away under certain conditions, which conditions are normally present during the purification process. Such conditions are e.g. an increased acidic environment, elevated temperatures and/or increased humidity.

Without wishing to be bound by any theory it is presently contemplated that under certain environmental conditions, e.g. an increased acidic environment and/or elevated temperatures and/or increased humidity, silicon compounds present in the Puzzolanes, e.g. in form of silica gel ($SiO_2$) and/or silicates ($SiO_4$) and/or zeolites as well as aluminium compounds, such as e.g. $Al_2O_3$, present in the Puzzolanes will be dissolved away, i.e. will be excavated from the Puzzolanes. The result thereof is on the one hand that the active surface of the Puzzolanes will be increased and will be available for adsorption of substances present in the fluids to be treated or purified. On the other hand the substances dissolved away or excavated, respectively from the Puzzolanes, that is the silicon- and/or the aluminium-compounds do also seem to participate in the removal of the toxic substances. Also, since the mere addition of the adsorptive capacity of said silicon-/aluminium-compounds and the adsorptive capacity of Trass did not bring about results achieved with the present Puzzolanes it is further contemplated that the silicon-/aluminium-compounds are dissolved away in a particular form that makes them apt for scavenging components. It is presently also conceived that internal areas/channels within the Puzzolanes, initially closed by the silicon-/aluminium-compounds are opened once a specific amount, i.e. about 5% by weight of the material had been dissolved away.

The above theory is supported by results of experiments wherein different Puzzolanes, e.g. Bavarian Trass (surface area according to BET about 22 $m^2/g$) and e.g. the Puzzolan Vulkanit 500, commercially available from the company Hauri, Germany (surface area according to BET about 11 $m^2/g$) have been subjected for a given time to acidic environmental conditions (water suspension, pH 5.0). Accordingly, it has been found that the water suspension containing Vulkanit 500 turned into a jelly like mass, which indicates a presence of silicon compounds present in water, which in turn may only have been excavated from the Puzzolanes. The same could not be observed with Bavarian Trass.

When repeating the above experiments and adding mercury compounds to the suspension it could also be shown that the amount of mercury remaining in the water solution was surprisingly much lower in the Vulcanit 500 assay as compared to the Bavarian Trass assay, which indicates a significant increased purification capability of this type of Puzzolanes going along with dissolving away silicon and aluminium compounds.

The results of additional experiments carried out showed that Puzzolanes exhibiting silicon and/or aluminium compounds which may be excavated from the Puzzolanes in an amount of at least about 5% by weight, showed an purification capability of fluids that was surprisingly much higher than that observed with Bavarian Trass, even though Bavarian Trass comprises a surface area, which twice as large or observed with materials, from which less than about 5% by weight matter had been excavated.

Furthermore, a comparison of the Puzzolanes proposed for use in the present method with Bavarian Trass, from which no silicon and or aluminium compounds may be dissolved away, such as $SiO_2$, $Na_2SiO_4$, and/or $Al_2O_3$, showed that even adding the purification capacities of Bavarian Trass and the silicon and aluminium compounds listed above did not approximately equal the purification capacity or capability, respectively, of the Puzzolanes proposed for use in the present method.

Hence, in its widest sense the present invention relates to the use of Puzzolanes, which contain an amount/portion of silicon compounds and/or aluminium compounds of at least 5% by weight, that may be dissolved way under certain environmental conditions, such as an increased acidic environment and/or elevated temperatures and/or increased humidity in a method for purifying fluids, e.g. combustion gases emitted from power plants, or liquids, such as water or ethanol, which method comprises the step of contacting the above Puzzolanes with the fluid to be purified under conditions, enabling excavation of the silicon and/or aluminium compounds from the Puzzolanes.

The Puzzolanes proposed for use in the present invention may be any natural or synthetic Puzzolane with the proviso that at least about 5% by weight of matter, i.e. silicon and/or aluminium compounds may be dissolved away from the Puzzolanes. Preferably at least about 7% by weight of matter shall be dissolvable away from the Puzzolanes, or at least about 10% by weight, more preferably at least 15% by weight, even more preferred at least about 20%, even more preferred at least about 25% by weight or 30% by weight or yet even more preferred at least about 35% y weight or 40% by weight, based on the weight of the Puzzolane from which the matter is excavated.

DETAILED DESCRIPTION OF CERTAIN EMBODIMENTS

As defined herein the term "matter that is dissolved away" or "excavated" or "released from" the Puzzolanes comprises silicone compounds and/or aluminium compounds, such as silica gel, silicates or zeolites, or alumina, such as e.g. $SiO_2$, $Na_2SiO_4$, and/or $Al_2O_3$.

As defined herein, the terms "the Puzzolanes proposed for use in the present invention/method" or "the Puzzolanes used in the invention" shall define Puzolane stone, wherein at least about 5% by weight of the stone material may be excavated according to the following process: a given volume of a ground stone material (Puzzolane, Blaine value about 2.500 $cm^2g$ or more) to be examined is weighed and subsequently suspended in 4 times volume of water, the pH of which had been adjusted to 5.0 by addition of hydrochloric acid. The suspension is stirred for 3 hours at a temperature of 25° C. Subsequently the stone material is separated from the liquid and/or jelly formed, respectively, and transferred to an oven, wherein it is dried for 3 hours at 150° C. at reduced pressure. The stone material thus dried is weighed and the weight is compared with the initial weight. If the weight difference is larger than about 5% by weight the Puzzolane examined is considered suitable for use in the present invention.

As defined herein the term "acidic environmental condition" or "increased acidic condition" shall designate a pH value of the environment of about at least about 6.5 or less, preferably about 6.0 or less, more preferably about 5.5 or less, more preferably about 5 or less, or about 4.5 or about 4.0 or about 3.5, or about 3.0, or about 2.5 or about 2.0 or even 1.5 or about 1.0 or about 0.5.

As defined herein the term "environmental temperature" or "ambient temperature" shall designate a temperature in the range of from about 18° C. to about 25° C., preferably from about 20° C. to about 25° C., more preferably 21° C. or 22° C. or 23° C. or 24° C. or 25° C.

As defined herein the term "elevated temperature" shall designate a temperature of about 25° C. or higher, i.e. a temperature in the range of from about 25° C. to about 900° C., or from about 25° C. to about 800° C., or from about 25° C. to about 700° C., or from about 25° C. to about 600° C., preferably from about 30° C. to about 500° C., or from about 30° C. to about 400° C., or from about 30° C. to about 300° C., from about 30° C. to about 200° C., or from about 35° C. to about 150° C., wherein each single temperature shall be explicitly mentioned in the intervals listed above i.e. e.g. 36° C., 37° C., 38° C., 39° C. 40° C. etc., i.e. 50° C. 60° C., 70° C., 80° C., 90° C. etc.

As defined herein the terms "environmental water content" or "environmental humidity" shall designate a particular content of water in the fluid to be treated, either in the form of gas or in a liquid state. The content shall be in a range of from about 5% to 100%, about 10% to 100%, preferably from about 15% to 100%, more preferably from about 20% to 100%, even more preferred from about 30% to 100% or from about 35% to 100%, or from about 40% to 100%, or from about 45% to 100%, or from about 50% to 100%, or from about 55% to 100%, or from about 60% to 100%, or from about 65% to 100%, or from about 70% to 100%, or from about 75% to 100%, or from about 80% to 100%, or from about 85% to 100%, or from about 90% to 100%, or from about 95% to 100%.

As defined herein the term "fluid" or "aequous fluid" shall designate a liquid or a gas, which contains a content of water of at least about 5%, as defined above under "environmental water content".

As defined herein all amounts indicated as "%" are meant "% by weight", unless otherwise indicated.

As defined herein the terms "exhaust gases" and "combustion gases" are used interchangeably in this description and shall designate gases produced and emitted by burning fossil fuels as such or when additionally burning waste material.

As defined herein the term "toxins", "toxic substances" and "contaminants" are used interchangeably and shall designate any compound or substance that is undesired to be contained in the fluid to be treated. The state of being undesired generally depends on the intended use of the fluid after treatment. A non-limiting list of undesired substances comprises mercury, heavy metals, nitric oxide, dioxines, chlorinated furanes, chlorinated hydrocarbons, aromatic hydrocarbons, carbon monoxide, hydrochloric acid, sulfur dioxide, sulfur hydride, bacteria, fungi, biological debris or any combination thereof.

As defined herein the terms "adsorption" and "deposition" are used interchangeably in this description and shall designate that particular compounds are bound to the surface of the present Puzzolanes.

According to the invention the Puzzolanes proposed for use in the present invention comprise a portion or an amount of silicon and/or aluminium compounds of at least 5% by weight, that may be dissolved way, i.e. excavated from the Puzzolanes under the conditions prevailing during or applied at, respectively, the purification process, such that the effective mixture of the Puzzolanes with an increased surface area and the silicone-/aluminium-compounds excavated therefrom is formed in situ, during the purification process itself.

According to an embodiment the Puzzolanes proposed for use in the present invention may be contacted with fluids under acidic environmental conditions or under neutral environmental conditions at ambient and/or at elevated temperatures.

As an example, gaseous fluid to be treated may be guided over or through the Puzzolanes proposed for use in the present invention, which Puzzolanes may be provided in a bed or in a container. According to an embodiment the Puzzolanes proposed for use in the present invention may also be directly introduced into the exhaust gases of power plants, e.g. by injecting ground stone material into the gas stream. As is well known in the art exhaust gases inherently comprise an elevated acid content.

According to another embodiment liquids may be contacted with the Puzzolanes proposed for use in the present invention at ambient temperature or elevates temperatures, e.g. in a range of from about 50° C. to about 90° C., or from about 60° C. to about 90° C., which liquids may be inherently acidic, may be made acidic by means of a suitable acid, such as HCL, or may exhibit a neutral pH. The liquid may be guided through a bed or a container containing the Puzzolanes proposed for use in the present invention, or the liquid may be provided in a container and contacted with the Puzzolanes e.g. under stirring for a given time period.

Depending on the need and the environmental conditions as well as depending on the portion of the silicon-/aluminium compounds, that may be excavated from the Puzzolanes additional compounds known to absorb or adsorb toxic components from the fluids to be treated may be used, especially silicon compounds, such as e.g. silica gel ($SiO_2$), silicates ($SiO_4$) and/or zeolites, or clay ($Al_2O_3$) or other compounds well known to the skilled person.

The skilled person may determine by means of simple experiments and without any burden, whether or not a particular Puzzolane qualifies as a Puzzolane suitable for use in the present invention, i.e. suitable for the purification of fluids, e.g. combustion gases and/or whether additional auxiliary components shall be used for achieving a specific desired effect. As described above Puzzolanes suitable for use in the present invention may be determined by suspending a given amount/volume of a Puzzolane to be examined in water and effecting a contact of the water with the Puzzolane for a given time period and under conditions that allow a dissolution away, or excavation, respectively of silicon-/aluminium-compounds contained therein. Such conditions suitable for allowing excavation may be adjusting the pH of the water to neutral, e.g. to a pH of 7.5 or 7.0, or acidic, e.g. to a pH of about 6.5 or about 6.0 or also about 5.5 or about 5.0 or about 4.5 or about 4 or less and contacting the Puzzolanes with the water, e.g. under stirring at ambient temperatures and/or elevated temperatures for a given time period, upon which the stone material is separated from the liquid/jelly formed, the material is dried and the weight is determined and compared with the initial weight of material used.

It has also be found that the readiness of dissolving away silicon-/aluminium-compounds from the Puzzolanes, and thus their inherent effectivity to rapidly remove toxic components from the fluids to be treated, is also subject to the grain size, which is normally indicated as the so called "Blaine-Value".

During the Experiments leading to the present invention it has further been found that Puzzolanes exhibiting "Blaine-values" of about 2.500 $cm^2/g$ or more do release silicon-/aluminium-compounds, if present in a releasable form, at a good rate and thus show good effectivity during the purification process within a reasonable period of time. This may be theoretically explained in that a small grain size primarily provides a larger outer surface area from which under the environmental conditions (acidic environment, temperature, humidity) the silicon-/aluminium-compounds may be excavated generally in higher amounts and more rapidly thus also forming the mixture of Puzzolane with increased (inner) surface area plus silicon-/aluminium-compounds more rapidly, as compared to starting with material exhibiting a smaller outer surface area. It will be appreciated by the skilled person that materials having a Blaine-value below 2.500 $cm^2/g$ may be used as well with the proviso that the time period for the contact with the fluid need to be extended to achieve good purification results.

In general, the Blaine-value of the Puzzolanes proposed for use in the present invention is 2.500 $cm^2/g$ or more, preferably 5.000 $cm^2/g$ or more, more preferably about 7.500 $cm^2/g$ or more, even more preferred about 9.000 cm²/g or more, more preferred about 11.000 cm²/g or more, such as about 14.000 cm²/g or 17.000 cm²/g or more.

It is also clear to a person of average skill that the grain size of the Puzzolanes proposed for use in the present invention may be suitably adjusted by appropriate grinding, thus providing a desired grain size depending on the Puzzolane put to use and the intended application. For example, in case of using Puzzolanes comprising a high amount of silicon-/aluminium-compounds, that may be dissolved away, a small Blaine value may be chosen, while still attaining good results, while when choosing Puzzolanes having a lower degree of silicon-/aluminium-compounds to be dissolved away a higher Blaine-value may be desired for attaining the results in a time period desired.

The present Puzzolanes proposed for use in the present invention are particular useful in purifying combustion gases of power plants, which are e.g. fired with coal. They are excellent adsorbents since under the conditions prevailing in combustion gases, i.e. elevated temperatures, a certain degree of humidity and an acidic environment the silicon-/aluminium-compounds are excavated in situ, so that both, the Puzzolanes from which the silicon-/aluminium-compounds had been dissolved away and that do now exhibit a higher active (inner) surface for adsorption, and the compounds dissolved away, i.e. the silicon-/aluminium-compounds also take part in the purification process in situ.

As a consequence, the Puzzolanes proposed for use in the present invention may be used without any pre-treatment.

Non-exclusive examples for Puzzolanes proposed for use in the present invention are e.g. Vulkanit 500, Zeomin SP90 and Zeomin SP100, all commercially available from the company Fa. Hauri (Bötzingen, Deutschland).

Since Puzzolanes are stone materials and thus not flammable they may be charged directly into the combustion chamber or into the exhaust gases shortly after the combustion chamber so as to remove toxic materials from the exhaust gases.

The Puzzolanes proposed for use in the present invention may be used directly and on their own, which has the advantage of lower costs as compared to activated carbon or activated Trass, especially when combustion gases of power plants are to be purified. However, depending on the need the Puzzolanes proposed for use in the present invention may also be used together with other known agents, such as the known activated carbon, coke and/or fly-ashes.

Another advantage of the Puzzolanes proposed for use in the present invention resides in that they are capable to scavenge acidic components present in the fluids to be purified, since said acidic components bring about a release of the silicon-/aluminium-compounds and are at least in part uptaken. This is of high importance especially in power plants run with fossil fuels or when burning waste material, which require a complex system to trap acidic compounds present in the exhaust/combustion gases.

If desired and appropriate the Puzzolanes proposed for use in the present invention may also be mixed with basic agents, such as e.g. calcium hydroxide, calcium carbonate, quicklime, dolomite, sodium carbonate and/or sodium bicarbonate, allowing an even better scavenge of acidic components present in the fluids to be treated.

According to a preferred embodiment the Puzzolanes proposed for use in the present invention are used together with carbon and chalk variants, such as e.g. in admixture with calcium carbonate, calcium hydroxide, activated carbon and/or koks.

According to another embodiment the present invention also relates to the use of the present Puzzolanes together with sulphur or as a carrier for additional adjuvants/additives, such as e.g. sulfides, polysulfides, thionates and polythionates (e.g. $-O_3S-S_n-SO_3^-$), sodium tetrasulfide, or elemental sulfur, which components assist in removal of mercury from fluids. Alternatively, or in addition catalytic agents may be incorporated on the surface area of the present Puzzolanes, such as vanadium, tungsten, titanium, palladium, rhodium, platinum, auer metal, Raney-nickel, manganese dioxide, vanadium pentoxide, Samarium(III)-oxide or Hopcalite.

These compounds may be deposited on the surface of the present Puzzolanes according to conventional methods, e.g. impregnating, preferably impregnating with soluble salts, e.g. copper nitrate. Accordingly the present Puzzolanes may be used for an adsorptive purification of the fluids and at the same time for assisting in a catalytic purification, e.g. in a reduction of SCR of nitrogen oxides in the combustion gases of cement ovens or in the oxidation of organic matter and/or chlorinated hydrocarbons and/or carbon monoxide.

According to another preferred embodiment the present Puzzolanes may be used together with elemental sulfur that may be present in admixture or may be hot-dip coated, or sinter-fused or glued optionally with soluble glass onto the present Puzzolanes, so as to achieve an essentially complete removal of mercury. Without wishing to be bound by any theory it is presently contemplated that also the silicon-/aluminium-compounds excavated from the Puzzolanes contribute to the effect observed, since they enable a fine distribution of the sulfur on a carrier.

Another advantage of the present Puzzolanes resides in their high adsorptive capacity for mercury, while not being flammable as e.g. activated carbon. As described above the present Puzzolanes may directly be introduced into a combustion chamber or at any stage downstream thereof into the exhaust-/combustion gases and may be put use without any problems at temperatures of even about 800° C., which temperatures do not alter the physical structure of the Puzzolanes. With a view to an adsorption of toxic substances a introduction at a location further downstream the exhaust gas stream might be appropriate, which exhaust gas still has a temperature of 300° C. or more or about 200° C. or more. Since being stone having a desired grain size, the present Puzzolanes will be taken along by and with the exhaust gas and may react with the gas until being collected on conventional web or electric filters used in the plant, where still gas flowing over the material may react therewith until removal thereof.

Another advantage resides in that Puzzolanes are in general abrasion resistant and do not tend to create fine dust. Since Puzzolanes may be ground according to any conventional process to a desired grain size or grain size distribution, they may be directly used in an airstream method as a replacement of activated carbon in power plants. They may be injected in a conventional way into the exhaust gas stream and whirled along with it, with solids being collected on a filter arranged downstream. Alternatively the present Puzzolanes may also be put to use in a packed bed, i.e. in form of a powder and/or of granules and/or glued on a carrier without reducing the surface accessible for the fluid to be treated.

Another advantage of the present Puzzolanes over activated carbon may be seen in that they exhibit a high water absorption capacity, which allows the purification process to be run near the dew point, without the filter becoming cemented, which cementation would occur when using activated carbon under these conditions. In addition, the present Puzzolanes do not deteriorate the properties of the fly-ashes to be used for the production of concrete.

The following examples illustrate the invention without limiting thereto

EXAMPLES

Example 1

Use of the Natural Puzzolan Vulkanit 500 for Purifying Exhaust Gases 27 l of a gas exhibiting the following pre-determined composition

| | |
|---|---|
| Nitrogen | 90 Vol.-% |
| Oxygen | 10 Vol.-% |
| HCl | 18.1 mg/l |
| Humidity | 0.15 g/l |
| Hg (als HgCl$_2$) | 4.428 g | has been guided at a rate of approx. 2.2 l/min at 170° C. through a tube containing 150 mg of a natural Puzzolane (Vulkanit 500, Hauri, Germany; active surface according to BET about 11; Blaine-value about 14.000). In the gas collected after the tube 0,931 g mercury could be found, which corresponds to an adsorption of mercury of about 78.9%.

Example 2

Comparative Assays

The experiment of Example 1 was repeated under the same conditions as above with the proviso of using the following materials:
A) 150 mg Vulkanit 500 & 150 mg Chalk;
B) 150 mg Chalk;
C) 150 mg Bavarian Trass (Surface according to BET' 22 m$^2$/g);
D) 150 mg SiO$_2$
E) 150 mg Na$_2$SiO$_4$
E) 150 mg Al$_2$O$_3$ The following results for mercury adsorption by the respective material could be determined:
A) 83.2%
B) 4.7%
C) 12%
D) 10.6%
E) 8.4%
F) 26.4%

From this it follows that mercury deposition of the Puzzolane used in Example 1 may be increased approximately additively by using in chalk in admixture. On the other hand, Bavarian Trass exhibiting an active surface nearly twice as large as Vulkanit 500 did only yield a mercury deposition of about 12%. In addition, the substances, which may be dissolved away from the Puzzolane (silicon-/aluminium-compounds) did not yield results, which could by means of addition equal to the results obtainable with Vulkanit 500 alone.

Example 3

Use of the Natural Puzzolane Vulkanit 500 in Admixture With Sulphur 27 l of a gas exhibiting the following pre-determined composition:

| | |
|---|---|
| Nitrogen | 90 Vol.-% |
| Oxygen | 10 Vol.-% |
| HCl | 18.1 mg/l |
| Humidity | 0.15 g/l |
| Hg (als HgCl$_2$) | 4.428 g | were guided at 170° C. through a tube containing 150 mg of a mixture consisting of 125 mg Vulkanit 500 and 25 mg sublimed sulphur (corresponds to a ratio of 5:1). 0.079 g mercury could be found in the gas after having passed the tube, which correspond to a mercury deposition of about 98.21%.

Example 4

Use of the Natural Puzzolane Vulkanit 500 in Admixture With Sulphur and Chalk 27 l of a gas exhibiting the following pre-determined composition:

| | |
|---|---|
| Nitrogen | 90 Vol.-% |
| Oxygen | 10 Vol.-% |
| HCl | 18.1 mg/l |
| Humidity | 0.15 g/l |
| Hg (als HgCl$_2$) | 4.428 g | were guided at 170° C. through a tube containing 150 mg of a mixture consisting of 125 mg Vulkanit 500 and 25 mg sublimed sulphur (corresponds to a ratio of 5:1) and 150 mg Chalk (Marker Zement, Harburg, Germany). In the gas having passed the tube merely 0.001 g mercury could be found, which correspond to a mercury deposition of about 99.98%.

Example 5

Use of the Natural Puzzolane SP 90

27 l of a gas exhibiting the following pre-determined composition:

| | |
|---|---|
| Nitrogen | 90 Vol.-% |
| Oxygen | 10 Vol.-% |
| HCl | 18.1 mg/l |
| Humidity | 0.15 g/l |
| Hg (als HgCl$_2$) | 4.428 g | were guided at 170° C. through a tube containing 150 mg of a mixture consisting of 150 mg SP 90 (Hauri, Germany, Blaine-value about 9000) (corresponds to a ratio of 5:1). In the gas having passed the tube mercury could be found in an amount of 1.204 g, which correspond to a mercury deposition of about 72.8%.

Example 6

Use of the Natural Puzzolane SP 90 in Admixture With Sulphur 27 l of a gas exhibiting the following pre-determined composition:

| | |
|---|---|
| Nitrogen | 90 Vol.-% |
| Oxygen | 10 Vol.-% |
| HCl | 18.1 mg/l |
| Humidity | 0.15 g/l |
| Hg (als $HgCl_2$) | 4.428 g | were guided at 170° C. through a tube containing 150 mg of a mixture consisting of 125 mg SP 90 (Hauri, Germany, Blaine-value about 9000) and 25 mg sublimed sulphur (corresponds to a ratio of 5:1). In the gas having passed the tube mercury could be found in an amount of 0.191 g, which correspond to a mercury deposition of about 95.69%.

Example 7

Use of the Natural Puzzolane Vulkanit 500 in the Prufication of Water

Different comparative assays were prepared by transferring Vulkanit V500 into graduated flasks up to a filling level of 200 ml and adjusting the volume to 1 liter with water, exhibiting a pH of 7.5 (assays: (A1, A2, A3, A4, A5, A6) and 6.0 (assays: B1, B2, B3, B4) and pH 3.0 (assays: C1, C2, C3, C4) (pH adjusted with 1N HCl). The volumes were transferred in stirring flasks and the volumes have been treated as follows:

| | |
|---|---|
| (A1) | stirring at 25° C. for 1 hours; |
| (A2) | stirring at 90° C. for 1 hour at reflux |
| (A3) | stirring at 25° C. for 6 hours |
| (A4) | stirring at 90° C. for 6 hours at reflux |
| (A5) | stirring at 25° C. for 24 hours |
| (A6) | stirring at 90° C. for 24 hours at reflux |
| (B1) | stirring at 25° C. for 1 hours |
| (B2) | stirring at 90° C. for 1 hour at reflux |
| (B3) | stirring at 25° C. for 6 hours |
| (B4) | stirring at 90° C. for 6 hours at reflux |
| (C1) | stirring at 25° C. for 1 hours |
| (C2) | stirring at 90° C. for 1 hour at reflux |
| (C3) | stirring at 25° C. for 6 hours |
| (C4) | stirring at 90° C. for 6 hours at reflux |

In the assays A1-A6, B1-B4 and C1-C4 the amount of material dissolved away was determined. The following results had been achieved:

| | |
|---|---|
| (A1) | 0.4% |
| (A2) | 1.8% |
| (A3) | 1.3% |
| (A4) | 4.7% |
| (A5) | 3.4% |
| (A6) | 5.9% |
| (B1) | 6.7% |
| (B2) | 9.4% |
| (B3) | 13.6% |
| (B4) | 27.8% |
| (C1) | 17.4% |
| (C2) | 24.6% |
| (C3) | 31.2% |
| (C4) | 36.3% |

It could be further determined (results not shown) that at a given temperature a prolongation of the treatment time period and/or a reduction of the pH-value did result in an increased excavation of material up to a certain upper level.

The above assays were repeated as described with the proviso that the solution contained 2 g $HgCl_2$. The amount of mercury remaining in the water after the respective treatment has been determined and the following results have been obtained (indicated in "g" determined in solution and percentage bound to Puzzolanes).

| | | |
|---|---|---|
| (A1) | 1.99 g | (0.5%) |
| (A2) | 1.96 g | (2.0%) |
| (A3) | 1.97 g | (1.5%) |
| (A4) | 1.81 g | (9.50%) |
| (A5) | 1.87 g | (6.5%) |
| (A6) | 1.26 g | (37.0%) |
| (B1) | 1.15 g | (42.5%) |
| (B2) | 0.99 g | (50.5%) |
| (B3) | 0.88 g | (56.0%) |
| (B4) | 0.58 g | (71.0%) |
| (C1) | 0.78 g | (61.0%) |
| (C2) | 0.61 g | (69.5%) |
| (C3) | 0.46 g | (77.0%) |
| (C4) | 0.38 g | (81.0%) |

As may be seen from the above results the Puzzolanes show a surprisingly increased adsorptive capacity when about 5% by weight or more of silicon-/aluminium-compounds have been dissolved away from the material. In theory this may be in part be explained in that upon removing such an amount of releasable matter, internal surface area so far closed and hidden is now made accessible for adsorption.

What is claimed is:

1. A process for the purification of a fluid, the process comprising:
    contacting the fluid with Puzzolanes that contain at least 5% by weight of silicon and/or aluminum compounds, wherein during purification, the fluid dissolves the silicon and/or aluminum compounds, such that the silicon and/or aluminum compounds are excavated from the Puzzolanes, thereby exposing remaining active solid surfaces of the Puzzolanes.

2. The process according to claim 1, wherein purification conditions during the process comprise a pH value of the fluid to be purified of 6.0 or less and/or elevated temperatures.

3. The process according to claim 1, wherein the Puzzolanes exhibit a Blaine-value of at least about 2.500 $cm^2/g$.

4. The process according to claim 1, wherein the Puzzolanes are used in admixture with silicon compounds selected from the group consisting of silica gel, silicates and/or zeolites, and aluminum compounds.

5. The process according to claim 1, wherein the Puzzolanes are used in admixture with elemental sulfur.

6. The process according to claim 5, wherein the sulfur is impregnated or sintered onto the Puzzolanes.

7. The process according to claim 1, wherein the Puzzolanes are mixed and/or impregnated with a component selected from the group consisting of, sulfides, polysulfides, thionates, polythionates, sodium tetrasulfides, metal salts, a catalytically active substance and any combination thereof, or wherein the Puzzolanes are charged with a component selected from the group consisting of elemental sulfur, water, glass and any combination thereof or wherein the Puzzolanes are mixed with activated Trass.

8. The process according to claim 7, wherein the metal salts comprise vanadium, tungsten, titanium, palladium, rhodium, platinum, auer metal, Raney nickel, manganese oxide, Vanadiumpentoxide, samarium(III)-oxide and/or Hopcalite or any combination thereof.

9. The process according to claim 1, wherein the Puzzolanes are mixed with coke, activated carbon and/or alkaline components or any combination thereof.

10. The process according to claim 1, wherein the fluid is purified from exhaust gases.

11. The process according to claim 1, wherein the purification comprises removal of contaminants from the fluid selected from the group consisting of mercury, heavy metals, nitric oxide, dioxines, chlorinated furanes, chlorinated hydrocarbons, aromatic hydrocarbons, carbon monoxide, hydrochloric acid, sulfur dioxide, sulfur hydride, bacteria, fungi, biological debris and any combination thereof.

* * * * *